Dec. 26, 1967 G. A. GALLAGHER 3,360,759
ADJUSTABLE WIRE-WOUND COMPONENT
Filed Oct. 27, 1964
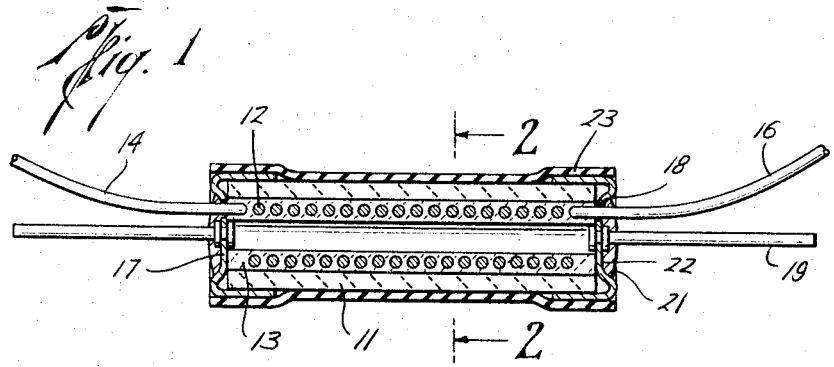
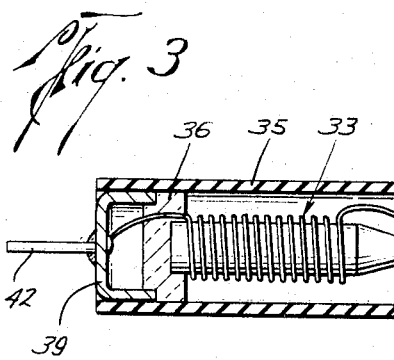
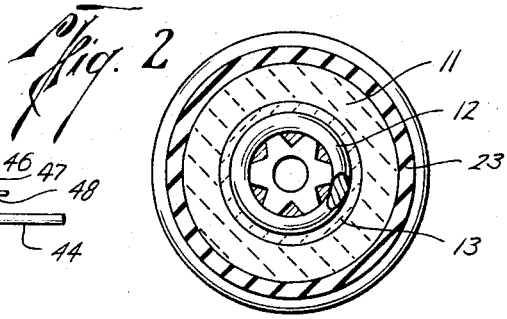
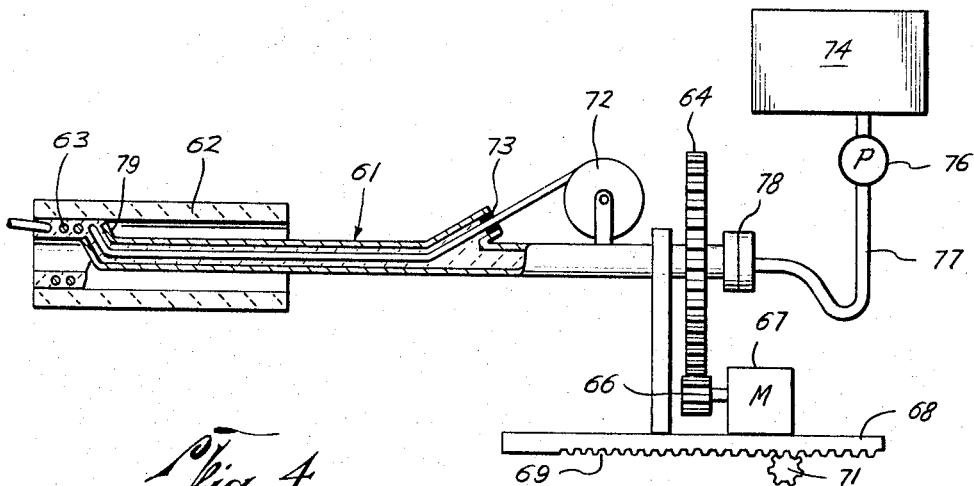
Gerard A. Gallagher
INVENTOR.
BY John E. Holder
ATTORNEY

United States Patent Office 3,360,759
Patented Dec. 26, 1967

3,360,759
ADJUSTABLE WIRE-WOUND COMPONENT
Gerard A. Gallagher, Chelmsford, Mass., assignor to Weston Instruments, Inc., Newark, N.J., a corporation of Texas
Filed Oct. 27, 1964, Ser. No. 406,708
6 Claims. (Cl. 338—195)

ABSTRACT OF THE DISCLOSURE

An adjustable electrical device including a tubular housing and conductive end caps closing the ends of the housing. A wire wound electrical element has spaced turns of bare wire within the housing arranged to feed freely toward an aperture in one of the end caps. An end of the bare wire extends through the aperture and may be pulled from outside the housing to remove wire from the spaced turns to adjust the electrical characteristics of the device. Terminals are connected to the end caps and a meltable electrically conductive substance secures the wire end at the aperture and electrically connects the end to the terminal. Melting the meltable substance frees the wire end for adjustment and hardening of the substance again fixes the wire end which need not be stripped because of the bare wire arrangement.

---

This invention relates to an adjustable wire-wound component, and, more particularly, to a wire-wound component having electrical parameters which may be adjusted while the component is installed in a circuit and its method of use and manufacture.

It is often desirable to provide a means for adjusting an electrical component such as a wire-wound resistor so that its resistance value can be adjusted to a precise value while the device is installed in a circuit. In the past, such incircuit resistance adjustment was provided by slide-type resistors or more expensive potentiometers. However, the minimum physical size of these devices is limited and further problems are encountered in the maintenance of proper wiper contact.

It is, therefore, an object of the present invention to provide a new and improved adjustable wire-wound component which may be conveniently adjusted, while in place in a circuit, to a desired precise value.

Another object of the present invention is to provide a new improved method of adjusting a wire-wound component to a precise value which may be fixed after the component is adjusted and which adjustment may take place while the component is installed in a circuit.

Yet another object of the invention is to provide a new and improved method of manufacturing an adjustable wire-wound component which may be conveniently adjusted to a precise value and which adjustment may take place while the component is in place in a circuit.

With these and other objects in view, the present invention is exemplified by a wire-wound component, its method of use and manufacture, which component is conveniently adjustable to a precise value and which value may be fixed in the component. More particularly, the invention includes a component comprised of bare wire wound in spaced turns about a mandrel. The wire-wound mandrel is centrally positioned within a tubular core or housing. One wire end of the coil is positioned through a hole in an end cap on the housing and held in place by solder. Upon melting of the solder, the wire may be pulled from the mandrel within the housing through the end cap until the amount of wire left within the housing is sufficient to provide an electrical parameter having a precise value. The solder on the end cap is then allowed to cool and the excess wire which has been pulled through the end cap is severed to precisely fix the value of the component.

The method of manufacturing such a component comprises the steps of winding a wire within a core or on a mandrel to form a coil and placing the coil within a protective case. End caps are then placed over each end of the protective case and a wire end of the coil is extended through an opening in one of the caps. A depressed portion on the one cap is then filled with solder which when solidified joins the wire end of the coil with the end cap. Upon subsequent melting of the solder, the extending wire end may be pulled to remove wire from the coil within the case. A complete understanding of this invention may be had by reference to the following detailed description when read in conjunction with the accompanying drawings illustrating embodiments thereof, wherein:

FIG. 1 illustrates a cross-sectional view of a resistor incorporating the present invention;

FIG. 2 is a cross-sectional view taken along line 2—2 of FIG. 1;

FIG. 3 shows another embodiment of a resistor incorporating the present invention; and FIG. 4 shows an apparatus for manufacturing a wire-wound coil by an alternative method.

For purposes of illustration, the following description of the invention will be directed toward a wire-wound resistor component. However, it will be readily appreciated that this invention would equally pertain to any wire-wound component such as an inductive device.

Referring now to FIG. 1, a resistor device is shown comprised of a tubular ceramic core or housing 11 within which is positioned a coil of bare wire having a plurality of turns 12. The coil of wire is secured to the interior wall of the ceramic core 11 by means of a potting compound 13 which also separates and electrically insulates each turn of wire forming the coil. The ends of the coil wire form leads 14 and 16 which when extended from the coil provide terminal connections. Flanged end caps 17 are positioned over each end of the ceramic core to form an enclosed housing for the resistor. Openings 18 are formed through the end caps to provide an outlet for bare wire ends 14 and 16. Electrically conductive terminal pins 19 are conveniently connected to the centers of the end caps and extend outwardly from the caps to provide convenient means for connecting the device to electrical circuit terminals.

A meltable electrically conductive substance 21 such as solder is shown filling a depressed portion or well 22 in the end caps to seal the opening 18 in the end caps and to provide an electrical connection between the bare wire ends 14 and 16 and the terminal pins 19. This meltable substance or solder 21, when solidified, also holds the bare wire ends 14 and 16 fixed to the end caps so that the wires may not be pulled from the resistor housing. An insulating covering 23 is provided over the outside of the ceramic core and end caps. This insulating covering is preferably made of a heat shrinkable tubing such as that sold by Dow Corning under the trademark Silastic 1410. A section of this tubing corresponding to the length of the resistor core is placed over the core. Heat is then applied to the assembly to shrink the tubing over the core and end caps. The resulting outer protective covering along with the solder sealed ends renders the resistor component substantially moisture proof.

The resistor component described above may be adjusted as follows: a portion of the wire from the resistance coil is removed through the solder sealed aperture at either end of the component. To make the adjustment, the solder is melted with a soldering iron until the wire can be pulled through the aperture. When the desired resistance is obtained, the solder is allowed to solidify and the excess wire is trimmed flush with the end cap.

FIG. 3 shows an alternative embodiment of the present invention which comprises a coil of wire upon a mandrel to form a resistor element 33. This resistor element is positioned within a tube 35 which is made of fiber glass or other suitable electrically insulating material. The resistor element is held spaced from the walls of the tube 35 by a spacer 36. End caps 39 and 43 are positioned within each end of the tube 35 to enclose the resistor and thereby form a protective housing. Terminals 42, 44 are fixed to and extend outwardly from the respective end caps 39, 43 to provide connecting means between the resistor and circuit wiring. One end of the wire forming the resistive element is shown connected to end cap 39 to provide an electrical connection between one end of the coil and the terminal 42. An opening 46 is formed through the other end cap 43. The other end of the wire coil serves as a lead 48 which projects through the opening 46 in end cap 43. A meltable electrically conductive substance 47, such as solder, is used to cover and seal the opening 46. This substance 47, when solidified, holds the lead wire 48 fixed to the end cap to prevent removal or pulling of the wire from about the mandrel. Conversely, upon melting of the substance 47, the lead wire 48 may be pulled to thereby strip or remove the wire forming the resistive element from the mandrel positioned within the tubular housing. Such withdrawal of wire from the coil will adjust an electrical parameter of the component, such as resistance in this instance, with the adjusted value of the component depending upon the amount of wire removed from the coil. When the component has been adjusted to the desired value in such a manner, the meltable substance 47 is allowed to solidify to prevent further removal of wire from the coil and thereby fix the resistance of the device at that desired value. The meltable electrically conductive substance 47 also provides an electrical connection between the wire lead 48 and terminal 44 and seals the component from the effects of moisture.

It may readily be appreciated that the wire-wound mandrel utilized in the component of FIG. 3 can be manufactured by conventional coil winding methods. However, the potted coil used in the component of FIG. 1 lends itself to a variety of manufacturing methods. An apparatus is shown in FIG. 4 for performing such a method of placing a wire in a coil within a tubular core. This apparatus includes a tubular mandrel 61 which is shown positioned within the interior of a ceramic core 62 into which a coil of wire 63 is being placed. The tubular mandrel has a geared flange 64 which is arranged to engage a gear 66 connected by a shaft to a motor 67. The mandrel and motor are positioned upon a base member 68 having a rack 69 thereon which engages a pinion gear 71. Pinion gear 71 is connected to a suitable source of power, not shown. A spool of wire 72 is shown positioned upon the mandrel 61 for rotation therewith. An opening 73 is formed in the side of the mandrel and is grommeted to provide an entrance for wire wound upon the spool 72 into the interior of the tubular mandrel. A reservoir 74 supplies a potting compound to the mandrel. The reservoir is connected through a pump 76 to a flexible hose 77 which is attached to the end of the tubular mandrel by means of a swivel connection 78. This reservoir and pump system supplies potting compound to the mandrel for application with the wire from reel 72 into the interior of the ceramic core 62.

In the operation of this apparatus, the mandrel is placed within a ceramic core. The motor 67 is started to rotate the mandrel. The pump 76 is actuated to pump the potting compound through the flexible hose and into the interior of the tubular mandrel. This pumping of the potting compound through the mandrel aids in drawing wire from the spool 72 to be applied with the compound within the interior of the ceramic core. The wire and potting compound are directed onto the interior surface of the core 62 by means of transverse exit nozzle 79 which is formed on the end of the mandrel. The spacing between the exit nozzle and the interior wall of the core is such that the wire is laid uniformly about and against the interior of the core and is at the same time impregnated with the potting compound. As the tubular mandrel rotates, it is moved longitudinally through the core by the rack and pinion mechanism 68, 71 until the wire has been laid throughout the full length of the core. The apparatus is then stopped and the wire being applied is severed to complete the operation.

It should be pointed out that other steps in the manufacture of the electrical device shown in FIGS. 1–3 may be adapted to principles of automatic manufacture, which principles are not subject of nor set forth in this application.

While the present invention has been disclosed as relating to a resistor, other wire-wound electrical devices could be constructed in the same manner and embody the features of this invention. Additionally, while particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention:

What is claimed is:

1. An adjustable electrical device comprising: a generally hollow casing having an end and an end member extending across and fixed to said end; a terminal fixed to said end member and extending away from the casing; said end member having an aperture therethrough offset to one side of said terminal; an electrical element in said casing comprised of bare wire wound in spaced turns and having an end; said end of said wire extending through said aperture and having a portion thereof exposed to be grasped from outside said casing; means mounting said electrical element in said casing to freely feed wire from said spaced turns through said aperture when said exposed portion is pulled from outside the casing; at least the portion of the end member between said terminal and said aperture being electrically conductive; an electrically conductive meltable substance, said substance when solidified fixing said wire end to said electrically conductive portion of said end member at said aperture to electrically connect said wire end to said terminal; said substance when melted freeing said wire end from said end member to allow pulling bare wire from said spaced turns through said aperture by grasping said exposed portion; whereby said electrical element can be readily adjusted by the user of the device subsequent to manufacture of the device.

2. An adjustable electrical device according to claim 1 wherein said terminal is fixed to said end member at a location along the axis of said tubular casing, and said aperture is offset to one side of said axis.

3. An adjustable resistor capable of being adjusted after it is connected in a circuit comprising: a generally tubular casing having an open end and an electrically conductive end member extending across and fixed to said open end; a terminal fixed to said end member at a location along the axis of said casing and extending away from the casing; said end member having an aperture therethrough offset to one side of the axis of said casing; a resistance element in said casing comprised of bare wire wound in spaced turns and having a first end and a second end; said first end extending through said aperture and having at least a portion thereof exposed to be grasped from outside said casing; said resistance element being mounted in said casing to freely feed wire from said spaced turns through said aperture when said exposed end is pulled from outside the casing; a meltable electrically conductive substance securing said first end to said electrically conductive end member at said aperture, whereby said first end is electrically connected to said first terminal; said meltable substance when melted freeing said first end to permit withdrawing wire from said resistance element by pulling said exposed portion; said meltable substance when solidified again fixing the wire to said end member at said aperture and electrically connecting same to said first terminal; and a second terminal mounted on said casing in electrically insulated relation to said first terminal, said second end of said resistance element being electrically connected to said second terminal.

4. An adjustable resistor comprising: a generally tubular casing having a first open end and a second open end aligned axially of the casing with the first end; a first end member fixed to and closing said first end and a second end member fixed to and closing said second end; a terminal fixed to said first end member at a location along the axis of the casing and extending away from the casing; an aperture in said first end member offset to one side of said terminal; at least the portion of said first end member between said terminal and said aperture being electrically conductive; a resistance element comprised of bare wire wound in spaced turns and having a first end and a second end, said first end extending through said aperture and having a portion exposed outside said casing; means mounting said bare wire resistance element within said casing to feed freely from said spaced turns toward and through said aperture when said exposed portion is pulled from outside the casing; an electrically conductive meltable substance, said substance when solidified fixing said first end of said bare wire to said first end member at said aperture and electrically connecting said first end of said bare wire to said terminal; said substance when melted freeing said end to allow pulling bare wire from said spaced turns through said aperture by grasping said exposed portion; a second terminal fixed to said second end member at a location along the axis of said casing, said second end of bare wire being electrically connected to said second terminal.

5. An adjustable resistor according to claim 4 wherein said spaced turns of bare wire are helically wound; and said means mounting said wire to feed through said aperture is a mandrel extending axially of said casing and through the helically wound wire, said mandrel being fixedly supported within said casing at a location offset toward said second end member, the other end of said mandrel extending toward and terminating at a location spaced from said first end member to permit said spaced turns to slip axially from said other end of the mandrel and allow the wire thereof to be drawn through said aperture when said exposed end is pulled.

6. An adjustable resistor according to claim 4 wherein said meltable substance closes said aperture to provide a sealed casing.

References Cited

UNITED STATES PATENTS

| 1,832,466 | 1/1931 | Means | 338—143 |
| 1,905,232 | 4/1933 | Kercher et al. | 338—268 X |
| 2,535,268 | 12/1950 | Coats | 338—268 X |
| 2,659,057 | 11/1953 | Legg et al. | 336—15 |
| 2,662,151 | 12/1953 | Bales | 338—268 X |
| 2,745,930 | 5/1956 | Reisman | 338—268 X |
| 3,253,241 | 5/1966 | Tippett | 336—15 |
| 2,502,950 | 4/1950 | Hugus et al. | 338—302 |
| 3,034,542 | 5/1962 | Blanco. | |

FOREIGN PATENTS

| 38,943 | 9/1896 | Germany. |
| 652,505 | 10/1937 | Germany. |

RICHARD M. WOOD, *Primary Examiner.*

J. G. SMITH, *Assistant Examiner.*